Figure 1:
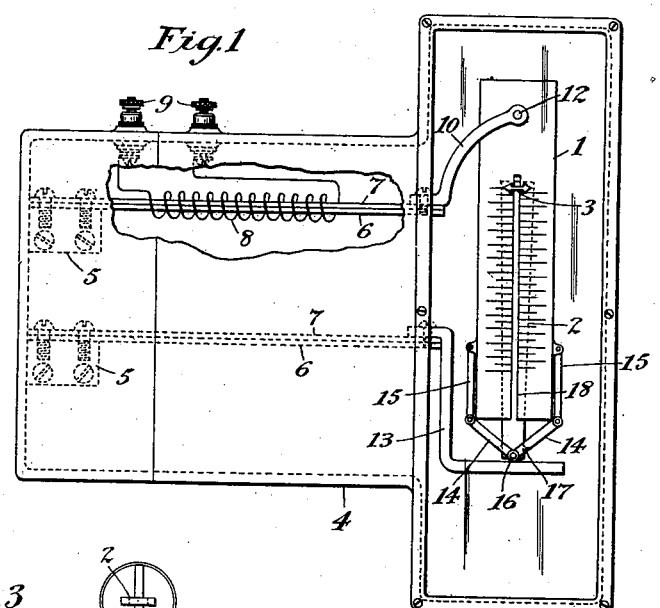

No. 739,967. PATENTED SEPT. 29, 1903.
J. WOHL & E. U. GIOVANNONI.
MAXIMUM OR INDICATING METER.
APPLICATION FILED DEC. 12, 1902.
NO MODEL. 2 SHEETS—SHEET 1.

Witnesses:
R. G. Clark
J. A. Delves

Inventors;
James Wohl and
Egisto U. Giovannoni.
by Attorney; Lewis J. Doolittle.

No. 739,967. PATENTED SEPT. 29, 1903.
J. WOHL & E. U. GIOVANNONI.
MAXIMUM OR INDICATING METER.
APPLICATION FILED DEC. 12, 1902.
NO MODEL. 2 SHEETS—SHEET 2.

No. 739,967. Patented September 29, 1903.

UNITED STATES PATENT OFFICE.

JAMES WOHL, OF BROOKLYN, AND EGISTO U. GIOVANNONI, OF NEW YORK, N. Y.

MAXIMUM OR INDICATING METER.

SPECIFICATION forming part of Letters Patent No. 739,967, dated September 29, 1903.

Application filed December 12, 1902. Serial No. 134,978. (No model.)

*To all whom it may concern:*

Be it known that we, JAMES WOHL, a resident of Brooklyn, Kings county, and EGISTO U. GIOVANNONI, a resident of New York, New York county, State of New York, citizens of the United States, have invented certain new and useful Improvements in Maximum or Indicating Meters, of which the following is a specification.

This invention relates to meters, more particularly to that class of meters which measure or indicate the maximum current which passes through the meter at any one time. To accomplish this in our invention, we prefer to employ two thermostats, each composed of two strips of metal which expand unequally, causing a deflection with the application of the same degree of heat. The object of using two thermostats is to allow for variations of atmospheric temperature. By the use of two thermostats which will maintain the same relative position under variations of atmospheric temperature a constant and correct reading for maximum current under any variations in atmospheric temperature is given, as will be more fully explained hereinafter.

If with the arrangement just stated an additional quantity of heat be applied to one of said thermostats, it will cause an additional deflection of this thermostat. This additional deflection is a measure of the heat applied, and when this heat is derived from an electric coil it is a measure of the current passing through this coil. To measure the deflection due to this additional heat, it is necessary to measure the deflection due to the atmospheric temperature, and the difference between this deflection and the total deflection will be the deflection due to the additional heat.

In our invention it is not necessary to actually measure the deflection due to atmospheric temperature, for by the use of two thermostats which are deflected equally by the same degree of heat it is only necessary to apply the additional heat to one of said thermostats, and by measuring the relative deflections we have a measure or index of this additional heat. To accomplish this, we prefer to employ a controller or support of suitable construction attached to one of the thermostats. An index of tapering form is carried by said controller. As the thermostat deflects the controller opens, allowing the index to pass through either by gravity or by use of suitable springs. The amount that this index passes through is indicated on a suitable scale, which is also carried by the same thermostat. The other thermostat acts as a compensator, being deflected only by atmospheric temperature. Consequently the reading is the relative deflection of the first thermostat and is an index of the maximum heat applied to this thermostat.

The details of construction of an embodiment of our invention are shown in the accompanying drawings, which form part of this specification.

Figure 3:
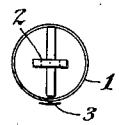
Figure 2:
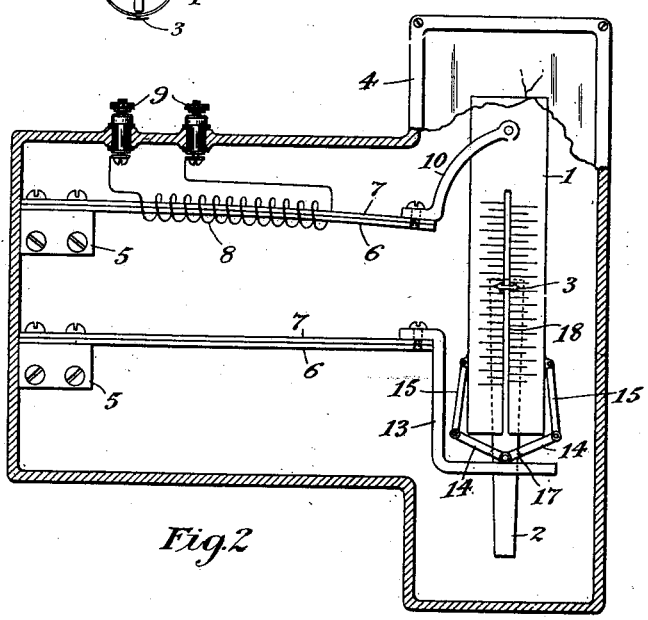
Figure 4:
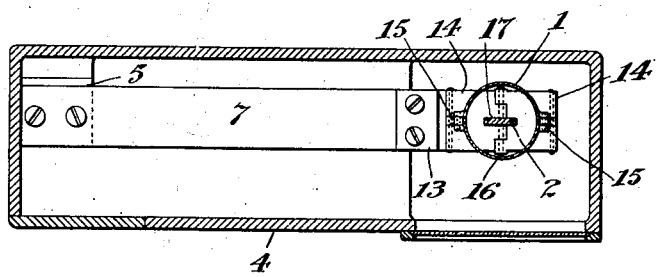
Figure 5:
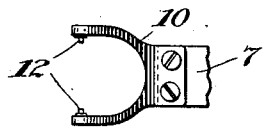

Figure 1 represents a side elevation of such a device under ordinary conditions and subject to atmospheric temperature only. Fig. 2 represents the same when current flows in the coil, causing a deflection of the thermostat upon which this coil is mounted. Fig. 3 is a detail which will be hereinafter described. Fig. 4 represents a sectional plan view, the section being taken midway between the two thermostats, showing the lower thermostat with the working parts operatively connected thereto. Fig. 5 represents a detail in plan of the yoke attached to the upper thermostat which carries the scale.

A case of suitable form and material is represented by 4 and is provided with suitable supports 5 for a pair of thermostats preferably formed of two strips of metal, such as iron and brass, which expand unequally upon application of heat and are represented by 6 and 7. A suitable coil or electrical conductor is represented diagrammatically by 8, from which suitable terminals 9 are provided. Attached to and carried by the upper thermostat may be a yoke, such as 10, carrying the scale 1 by means of a pivoted attachment 12. The lower thermostat may be provided with a similar yoke, such as 13, which acts as a stop for the controlling-levers 14. These levers 14 are not attached to the yoke 13, but are carried by the scale 1 by means of suitable links 15 and are pivoted at 16, at which point the yoke 13 acts as a stop and causes them to open on any downward movement of the upper thermostat relative to the lower, such as would be caused by the application of heat to the upper thermostat by the passage of current through the coil 8. It is thus seen that the lower thermostat, which is affected only by the atmospheric temperature, acts as a compensating stop, and the relative deflection is a direct result of the additional heat applied to the upper thermostat, as both thermostats deflect equally under atmospheric temperature alone, carrying scale and index, thus automatically correcting the reading of the scale for atmospheric temperature and giving directly the maximum relative deflection.

The controlling-lever may be provided with a variable opening or dimension, such as shown at 17, through which passes a scale, such as 2, which may be provided with tapering sides to allow it to drop a distance depending upon the amount of opening at 17. Once having dropped the index will remain in the position corresponding to the maximum current flowing at any one time until reset by raising or pushing it back through opening 17. The scale 1 is shown in tubular form and serves as a guide for the index 2 and a light arm 3, which also serves as a pointer over the scale. A slot in the scale-tube 1 is shown at 18 to allow this pointer to project outside.

All movable parts can be made of any suitable light material.

It is evident that many variations may be made in the form and details of construction of the several parts of this device as shown without departing from the scope of our invention, and we do not limit ourselves to the particular construction shown, as it is intended only to illustrate one operative embodiment of our invention.

What we claim is—

1. In a meter, the combination of two parallel deflecting thermostats adapted to maintain the same relative positions under variations of atmospheric temperature, means for applying a measurable quantity of heat to one of said thermostats, and means for measuring the resulting relative deflection of said thermostat.

2. In a meter, the combination of two parallel deflecting thermostats adapted to maintain the same relative positions under variations of atmospheric temperature, an electrical heating-coil in operative relation to one of said thermostats, and means for measuring the resulting relative deflection of said thermostats.

3. In a meter, the combination of two thermostats adapted to maintain the same relative positions under variations of atmospheric temperature, means for applying a measurable quantity of heat to one of said thermostats, a controller having a variable dimension governed by the relative deflection of the two thermostats, and an index governed by said controller and operative to measure the maximum relative deflection.

4. In a meter, the combination of two thermostats adapted to maintain the same relative positions under variations of atmospheric temperature, means for applying a measurable quantity of heat to one of said thermostats, a controller carried by said thermostat and having a variable dimension governed by the relative deflection of the two thermostats, and an index with tapering sides governed by said controller and operative to measure the maximum relative deflection.

5. In a meter, the combination of two thermostats adapted to maintain the same relative positions under variations of atmospheric temperature, means for applying a measurable quantity of heat to one of said thermostats, a pair of controlling-levers carried by said thermostat and having a variable dimension governed by the relative deflection of the two thermostats, and an index governed by said levers and operative to measure the maximum relative deflection.

6. In a meter, the combination of two thermostats adapted to maintain the same relative positions under variations of atmospheric temperature, means for applying a measurable quantity of heat to one of said thermostats, a controller having a variable dimension governed by the relative deflection of the two thermostats, an index governed by said controller, and a scale carried by said thermostat and acting in conjunction with said index to measure the maximum relative deflection.

7. In a meter, the combination of two thermostats adapted to maintain the same relative positions under variations of atmospheric temperature, means for applying a measurable quantity of heat to one of said thermostats, a controller having a variable dimension governed by the relative deflection of the two thermostats, an index governed by said controller, and a tubular scale carried by said thermostat and forming a guide for and acting in conjunction with said index to measure the maximum relative deflection.

Signed at New York city, in the county of New York and State of New York, this 10th day of December, A. D. 1902.

JAMES WOHL.
EGISTO U. GIOVANNONI.

Witnesses:
LOUIS PH. GEYER,
EMMA E. GEYER.